(12) United States Patent
Winters

(10) Patent No.: US 12,552,210 B2
(45) Date of Patent: Feb. 17, 2026

(54) HITCH ASSEMBLY FOR VEHICLE FRONT TOW HOOK

(71) Applicant: David J. Winters, Glenwood, MO (US)

(72) Inventor: David J. Winters, Glenwood, MO (US)

( * ) Notice: Subject to any disclaimer, the term of this patent is extended or adjusted under 35 U.S.C. 154(b) by 435 days.

(21) Appl. No.: 18/337,312

(22) Filed: Jun. 19, 2023

(65) Prior Publication Data

US 2024/0416697 A1  Dec. 19, 2024

(51) Int. Cl.
*B60D 1/56* (2006.01)

(52) U.S. Cl.
CPC .................... *B60D 1/565* (2013.01)

(58) Field of Classification Search
CPC ....................................... B60D 1/565
See application file for complete search history.

(56) References Cited

U.S. PATENT DOCUMENTS

| 6,902,183 | B2 * | 6/2005 | Rodgers | B60D 1/00 |
| | | | | 280/514 |
| 9,016,643 | B2 * | 4/2015 | Sterling | B60D 1/58 |
| | | | | 248/316.1 |
| 10,081,223 | B2 * | 9/2018 | Allen | B60D 1/58 |
| D1,047,787 | S * | 10/2024 | Winters | D12/162 |

FOREIGN PATENT DOCUMENTS

CN  109131415 A * 1/2019 ............... B61G 5/00

* cited by examiner

*Primary Examiner* — Kevin Hurley
(74) *Attorney, Agent, or Firm* — McKee, Voorhees & Sease, PLC

(57) ABSTRACT

The front hitch assembly clamps onto a tow hook or loop on the front of a truck or towing vehicle. The hitch assembly includes first and second bodies each having a curved, recessed channel formed therein to matingly engage with the hook or loop when the bodies are mounted on opposite sides of the hook or loop, thereby sandwiching the hook or loop in the channels. A tab extends forwardly from one of the bodies for coupling with the towed vehicle. The bodies are secured with a single threaded bolt for quick and easy mounting of the hitch assembly to the tow hook or loop.

20 Claims, 8 Drawing Sheets

HITCH ASSEMBLY FOR VEHICLE FRONT TOW HOOK

TECHNICAL FIELD

The field of the invention relates to hitch assemblies, and particularly a hitch assembly for mounting onto the front tow hook of a truck or other vehicle.

BACKGROUND

Rear hitch assemblies are common on trucks and other vehicles for towing and backing trailers, agricultural equipment, boats, campers, and other vehicles to desired locations. However, it is often difficult to back a trailer or other vehicle into place using the rear hitch assembly also, backing up a towed vehicle creates visual challenges, since the driver is turned in the seat to see behind him or her, or must use the rear view and side mirrors to see the position of the towed vehicle.

Front hitch assemblies are known, but not as common as a rear hitch assembly. For example, U.S. Pat. No. 6,902,183 discloses a front hitch assembly mounted on a tow hook mounted on the front of a truck. One concern with this prior art front hitch assembly is the transfer of all towing forces onto the single bolt which secures the assembly onto the tow hook. This prior art front hitch assembly also does not immediately fit tightly on the toe hook or loop, and is subject to sliding or turning about the tow loop when a towed vehicle is being pulled or pushed by the towing vehicle.

Therefore, there is a need for an improved front hitch assembly for use on the front hook or loop of a truck or other towing vehicle.

Accordingly, a primary objective of the present invention is the provision of a hitch assembly securely mounted to a front hook or loop on a vehicle, such as a truck.

Another objective of the present invention is the provision of a front hitch assembly for a vehicle which mounts to a vehicle quickly and easily.

A further objective of the present invention is the provision of a front hitch assembly which mounts to a truck using a single bolt.

Still another objective of the present invention is a provision of a front hitch assembly which immediately clamps onto a hook or loop extending forwardly on the front end of a vehicle.

Yet another objective of the present invention is a provision of a front hitch assembly having a pair of cast clamp members each having a curved recess to match the profile of a hook or loop on the front of a vehicle.

These and other objectives become apparent from the following description of the invention.

SUMMARY

The front hitch assembly for a vehicle tow hook or loop includes first and second bodies or clamp members, each cast as a single piece with a curved recess formed therein. Each recess is C-shaped in a cross-section and stands in a C-shape between opposite ends to form a channel adapted to receive a tow hook or loop. The pair of bodies or clamp members are mounted on opposite sides of the hook or loop and secured together by a single bolt. The recesses or channels immediately engaged the hook or loop, so that the towing or pulling forces are displaced across the bodies, rather than merely on the fastening bolt. The mating engagement of the hook or loop and the clamp recesses also eliminates turning or shifting of the bodies or clamp members on the hook or loop. One of the bodies includes a tongue or tab for coupling to the trailer or tongue of a towed vehicle.

DETAILED DESCRIPTION

Figure 1:
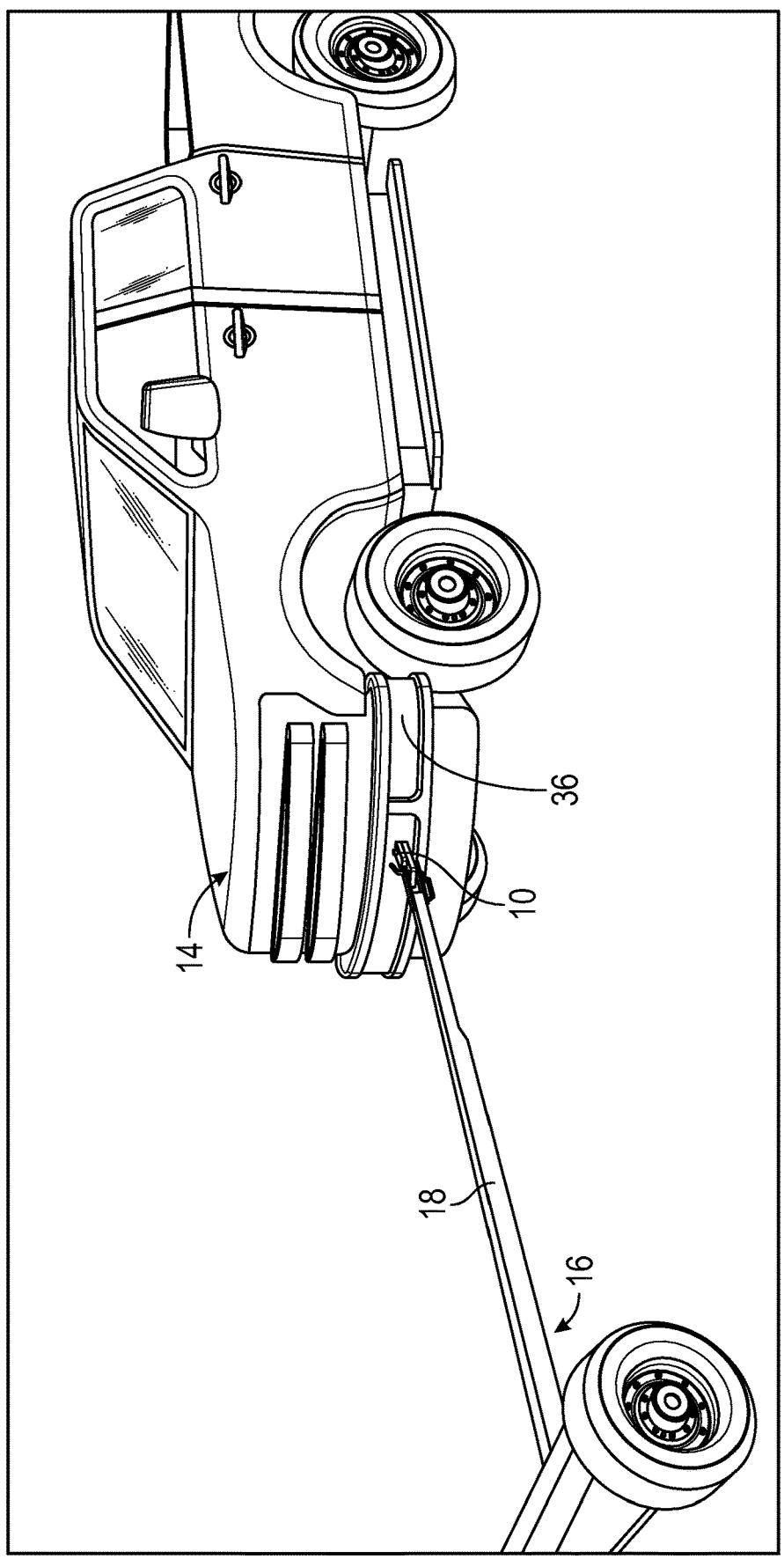
FIG. 1 is a perspective view of the front hitch assembly of the present invention mounted to a front hook on a pickup truck and connected to a trailer tongue.
Figure 2:
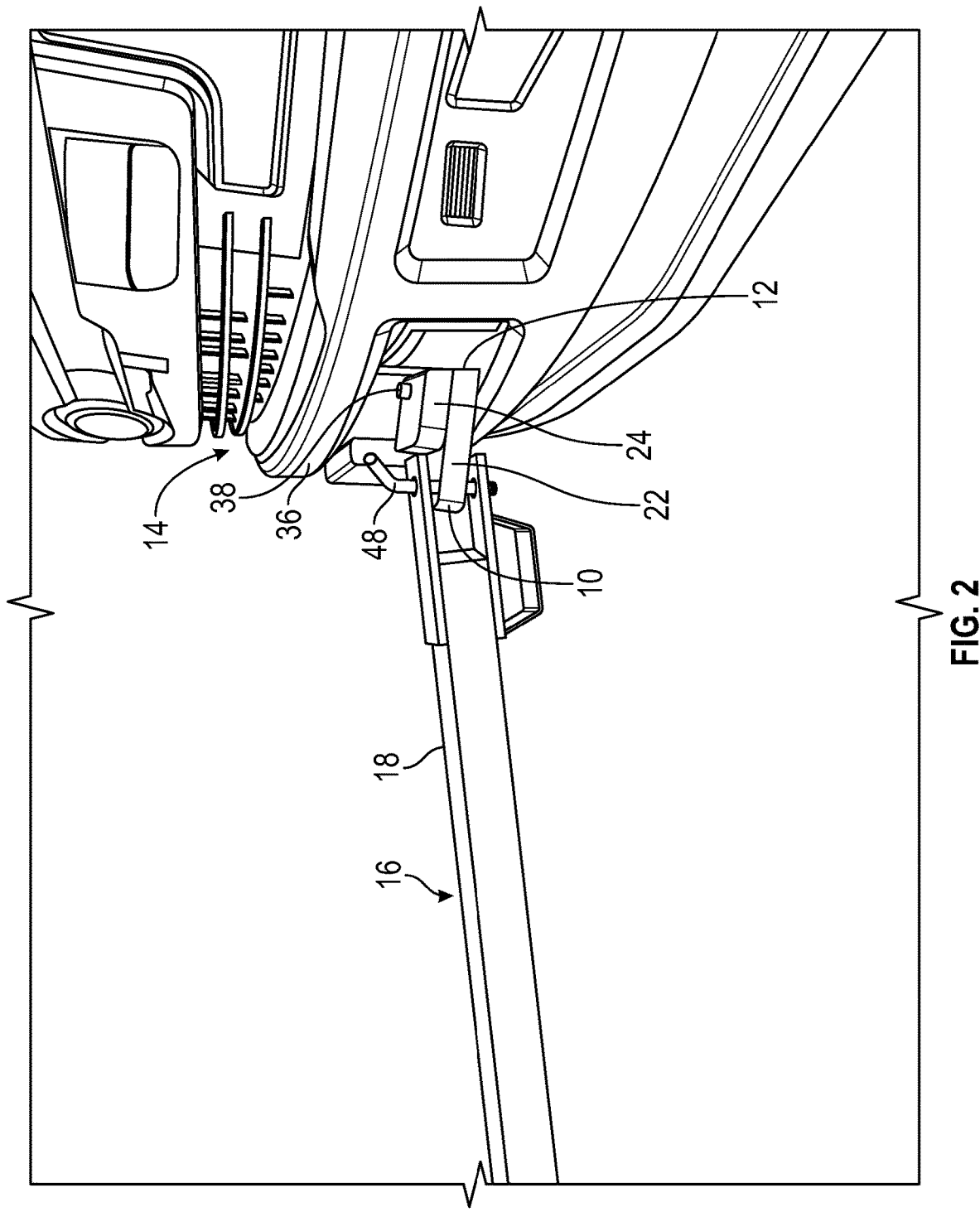
FIG. 2 is a close up view from FIG. 1 of the hitch assembly of the present invention.
Figure 3:
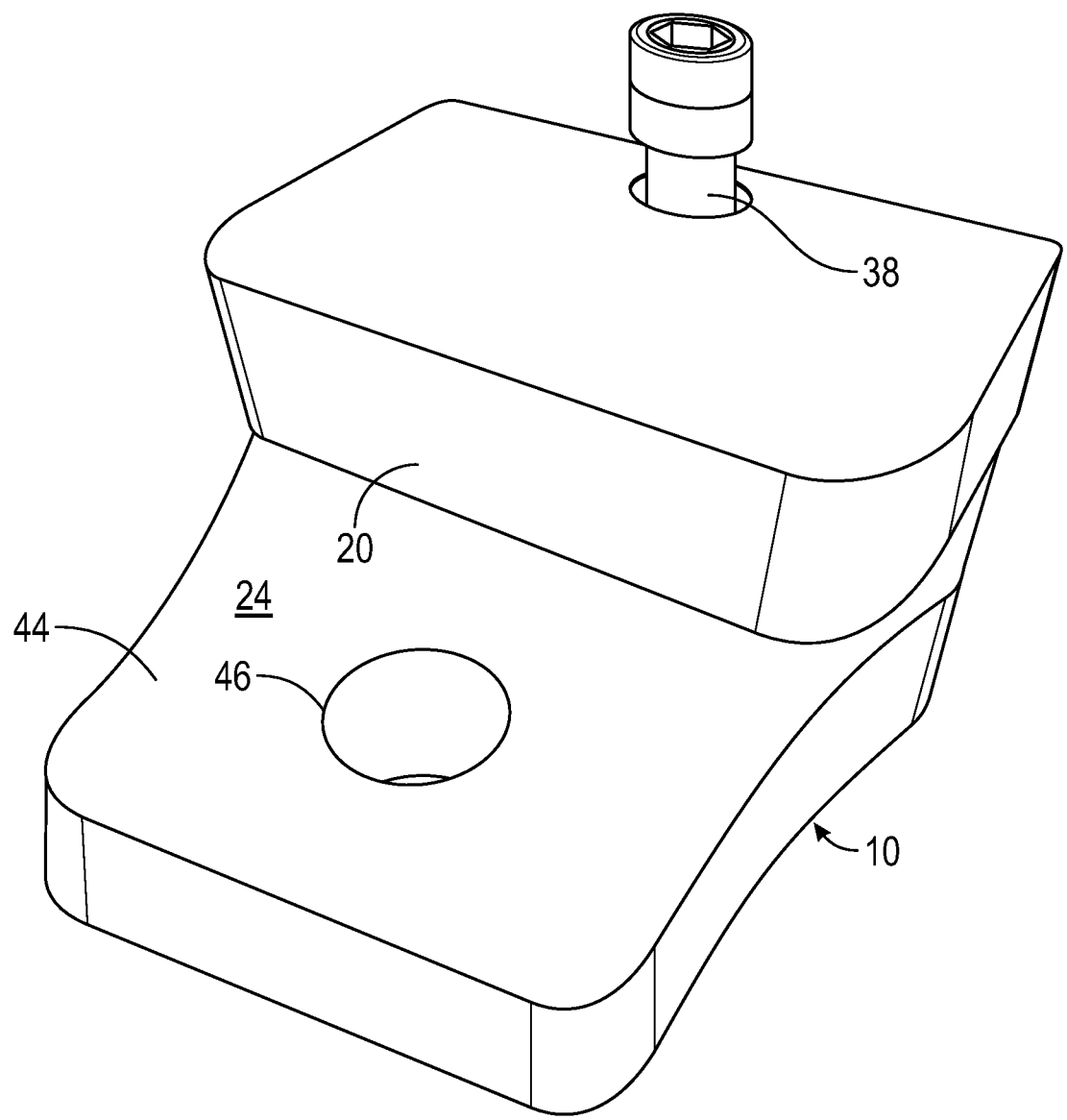
FIG. 3 is an upper perspective of the hitch assembly of the present invention.
Figure 4:
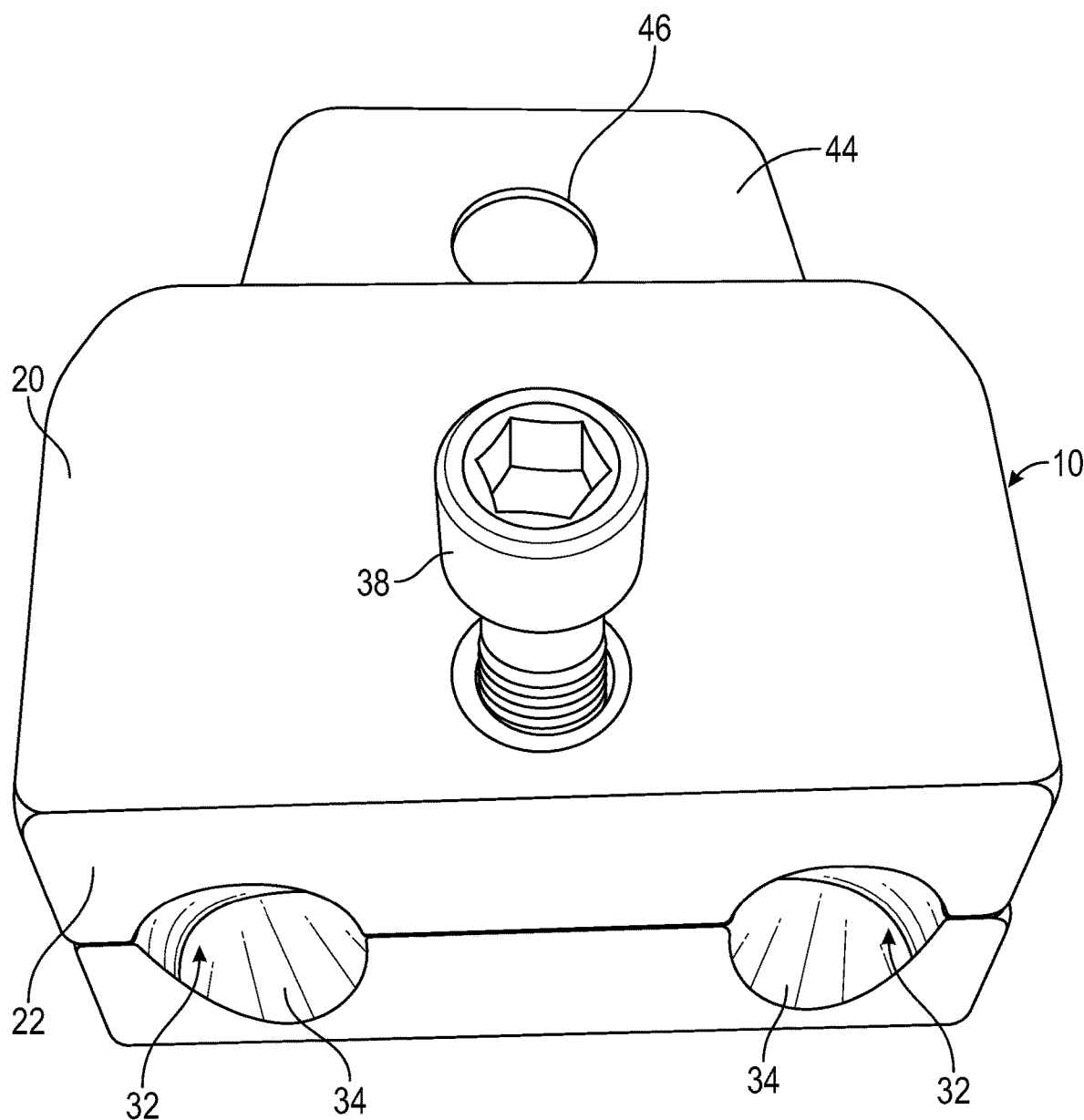
FIG. 4 is another rear upper perspective of the hitch assembly.
Figure 5:
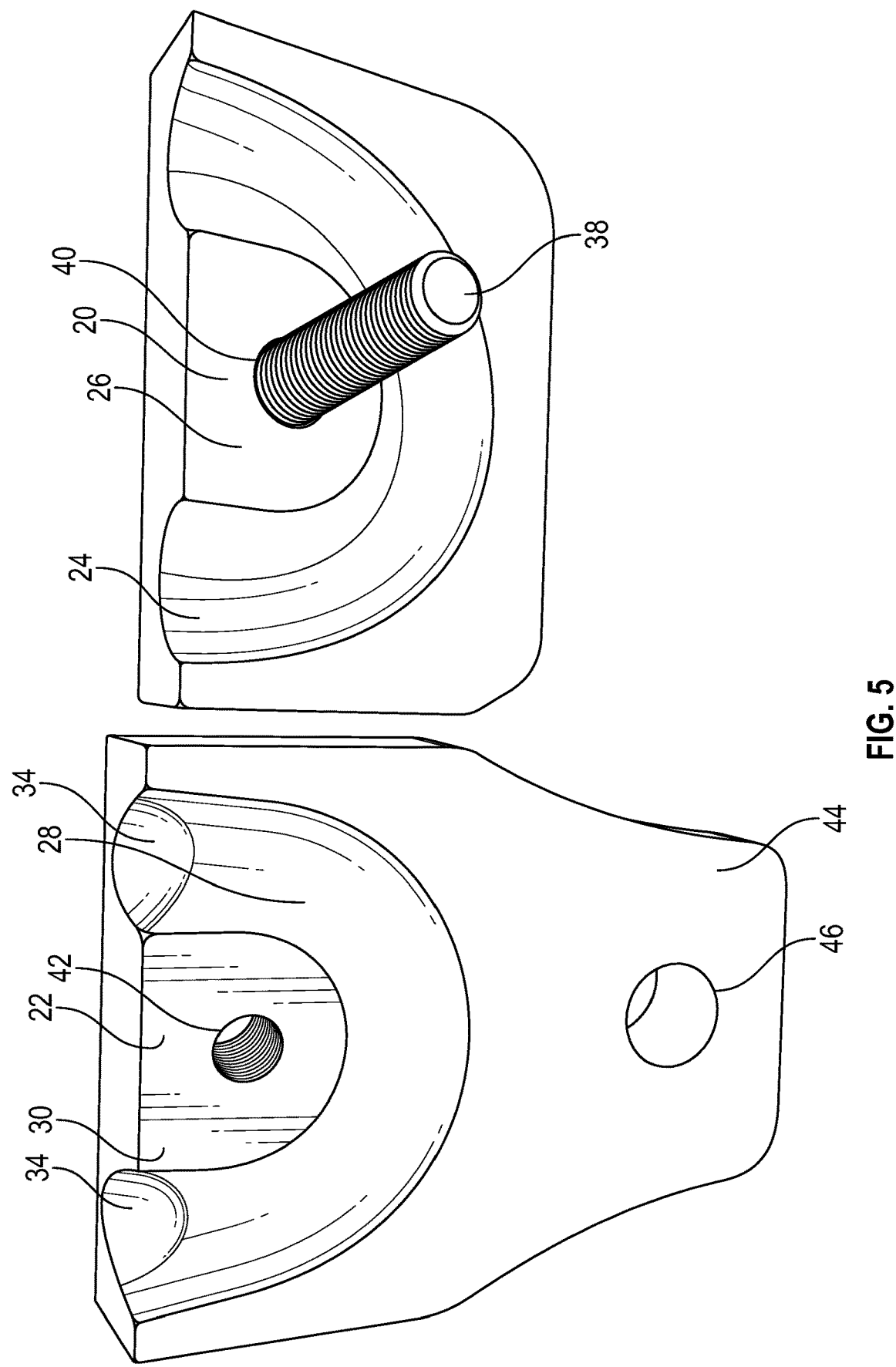
FIG. 5 is a view showing the disassembled hitch assembly components, and showing the interior channels in the clamp members.
Figure 6:
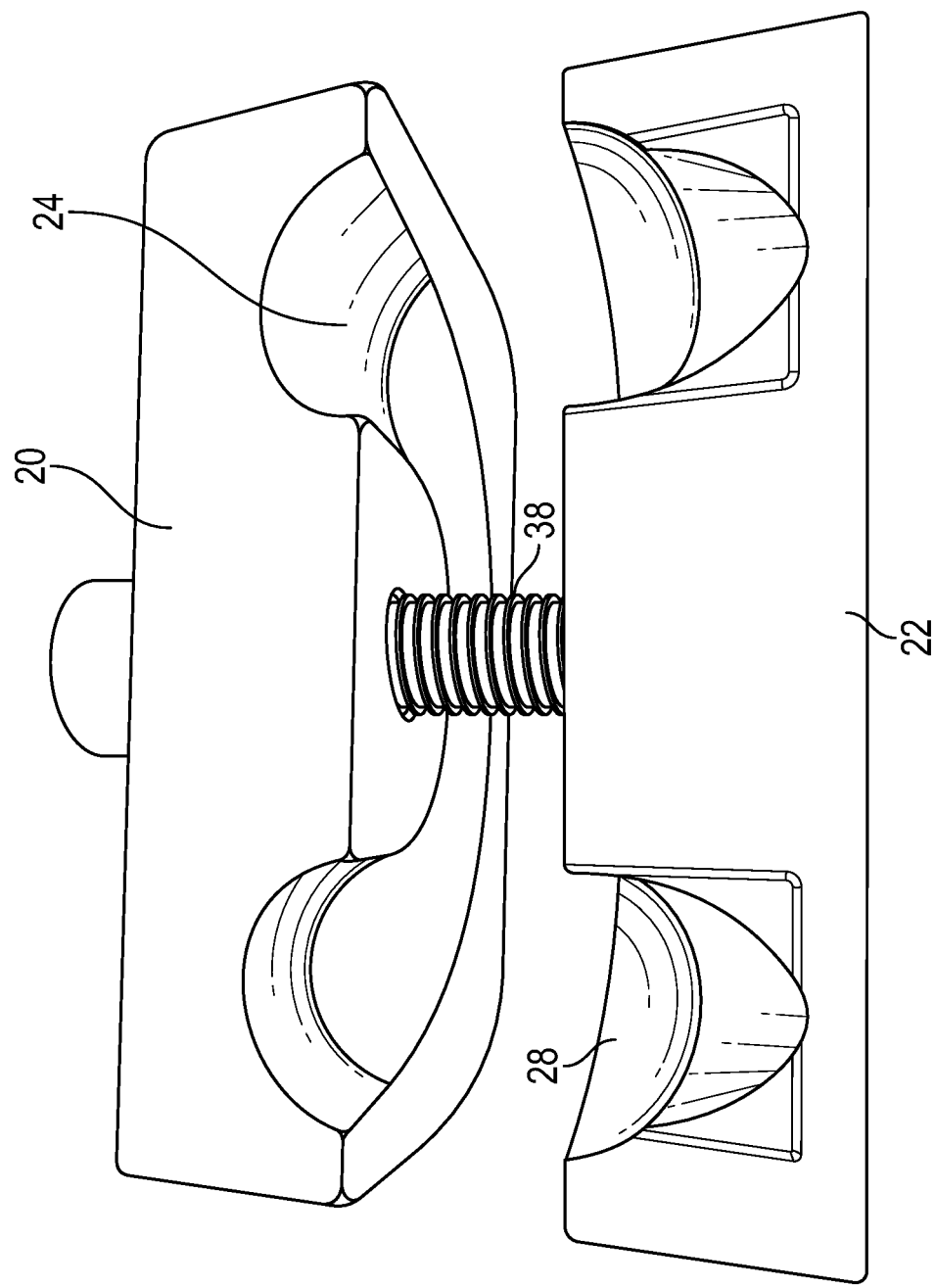
FIG. 6 is a rear view of the hitch assembly with the clamp members partially opened.

The hitch assembly of the present invention is generally designated in the drawings by the reference 10. The hitch assembly 10 is adapted to be mounted to a front tow hook or loop 12 of a truck or other vehicle 14.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

Once the hitch assembly 10 is mounted on the tow hook or loop 12, a trailer or other wheeled vehicle 16 can be attached to the hitch assembly 10 via the trailer tongue 18 for moving the trailer to a desired location.

The hitch assembly 10 includes first and second clamp bodies or members 20, 22. Preferably, each body or clamp member 20, 22 is cast with a one-piece construction. A first recess 24 is formed on an inner surface 26 of the first clamp member. A second recess 28 is formed on an inner surface 30 of the second clamp member 22. The inner surfaces 26, 30 are flat and smooth, so that when the clamp members 20, 22 are assembled, the first and second recesses 24, 28 form an internal channel 32 in the hitch assembly 10.

Figure 7:
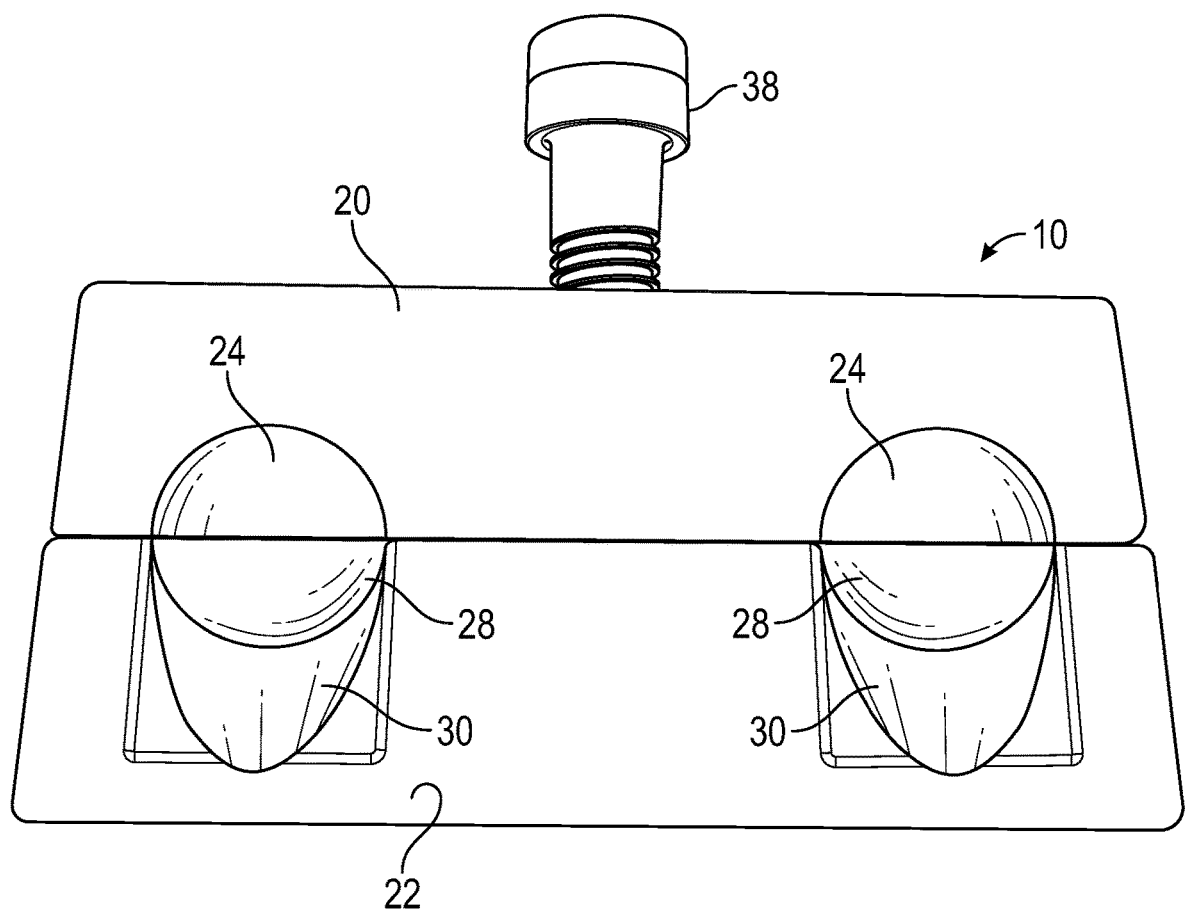
FIG. 7 is a rear view of the hitch assembly with the clamp members in a closed position.
Figure 8:
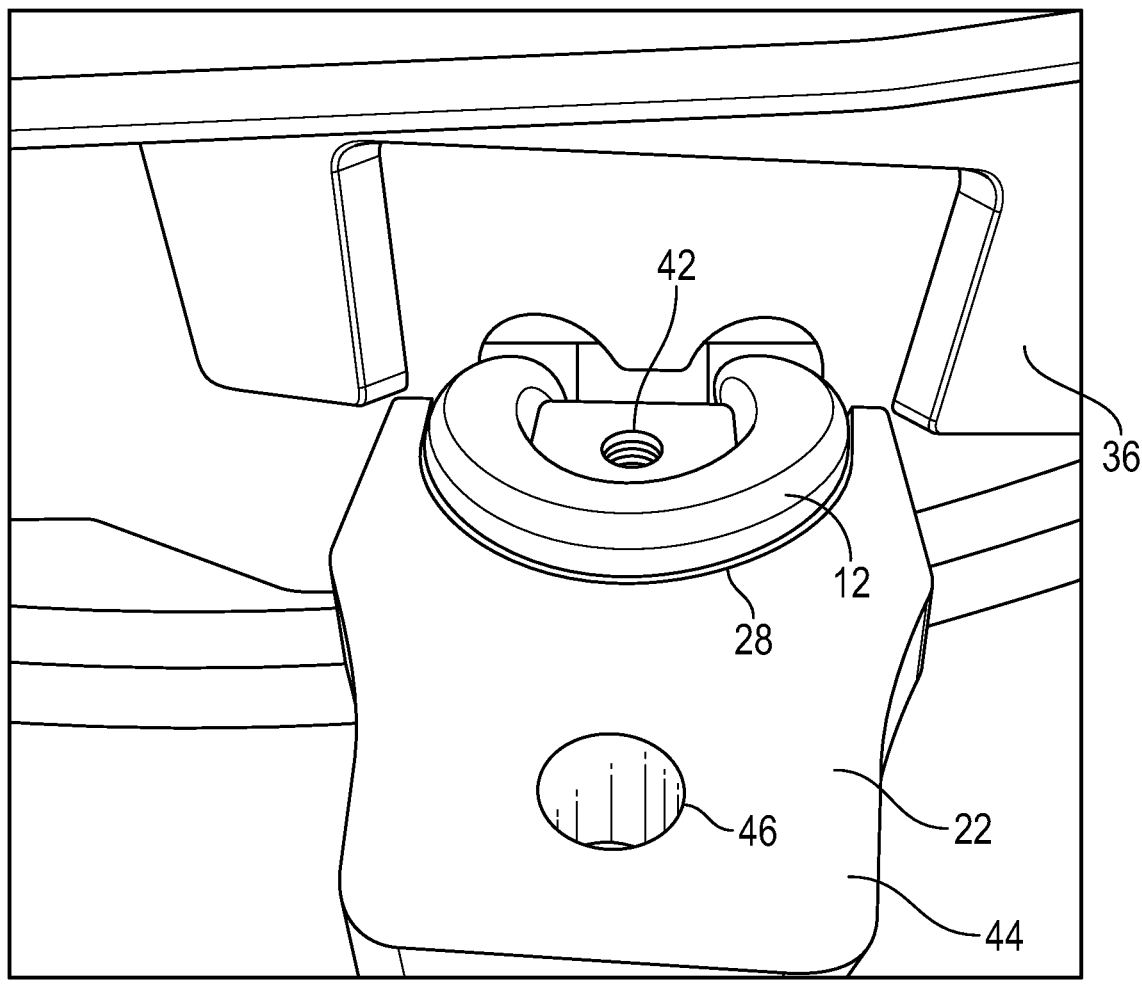
FIG. 8 is a perspective view of one of the clamp members of the hitch assembly positioned beneath the front tunnel hook or loop of the pickup truck shown in FIG. 1.

The recesses 24, 28 have profiles which match the shape of the tow hook or loop 12. For example, for the loop 12 shown in FIG. 8, each recess 24, 28 has a C-shaped cross-sectional profile extending from end to end, so that the channel 32 has a C-shape from end to end. As seen in FIG. 7, one or both of the recesses 24, 28 may have flared ends 34 to accommodate the non-planar portion of the hook or loop 12 adjacent the front bumper 36 of the truck 14. Thus, in the preferred embodiment, the shape of the channel 32 matches the shape of the hook or loop 12. Since different trucks have differently shaped tow hooks, it is understood that the shape of the recesses 24, 28 may be different that that shown in the Figures, without departing from the scope of the invention.

The first and second clamp bodies 20, 22 are secured together with a single bolt 38. One of the clamp bodies 20, 22 has a non-threaded hole 40 through which the bolt 38 extends. The other of the clamp bodies 20, 22 has a threaded hole 42 into which the bolt 38 is threaded. When the bolt or threaded connector 38 is tightened, the clamp bodies 20, 22 are securely fixed onto the tow hook or loop 12.

One of the clamp bodies 20, 22 also includes a forwardly extending tab 44 having a non-threaded hole 46 extending vertically therethrough. The tab 44 is adapted to receive the end of the tongue 18 of the trailer 16. A hitch pin 48 extends through holes in the tongue 18 and the hole 46 of the tab 44 to mount the tongue on the hitch assembly 10. As an alternative to the hitch pin, a conventional ball hitch (not shown) can be mounted to the assembly 10 by extending the shaft of the ball hitch through the hole 46 and securing the ball hitch nut. Another option is to use a pair of the hitch assemblies 10 on two hooks on the front of the truck, with the dual assemblies functioning as a platform for a deer guard or other devices which can otherwise be mounted on the front end of a truck or vehicle, such as a winch or a snow plow.

The hitch assembly 10 is an alternative to a rear hitch on the back of the truck or tow vehicle, which oftentimes is more difficult to maneuver. The front hitch assembly 10 also provides improved visibility for the truck driver who does not have to look rearwardly or rely on mirrors for backing the trailer 16 into position. The mating engagement of the channel 32 with the hook or loop 12 distributes loads across the clamp bodies 20, 22. The matching profile of the channel 32 and the hope/loop 12 also prevents the hitch assembly 10 from twisting or shifting after the bolt 38 is tightened and during use.

Thus, the hitch assembly 10 of the present invention accomplishes at least all of the stated objectives.

What is claimed is:

1. A hitch assembly for a front tow hook of a vehicle, comprising:
   a first body half having a curved recess formed therein;
   a second body having a curved recess formed therein; and
   the first and second bodies being secured together on the tow hook whereby the recesses matingly receive the tow hook.

2. The hitch assembly of claim 1 further comprising a single bolt extending into aligned first and second holes in the first and second bodies to clamp the halves together.

3. The hitch assembly of claim 2 wherein one of the holes is threaded and the other of the holes is not threaded.

4. The hitch assembly of claim 1 wherein the recesses have a shape matching a profile of the tow hook.

5. The hitch assembly of claim 1 wherein the recesses are mirror images of one another.

6. The hitch assembly of claim 1 wherein the recesses form a channel to enclose the tow hook when the first and second bodies are secured together.

7. The hitch assembly of claim 1 wherein one of the first and second bodies has a tongue adapted to couple to a trailer.

8. The hitch assembly of claim 7 wherein the tongue has a vertical hole adapted to receive a hitch pin.

9. The hitch assembly of claim 1 wherein the recess on the bottom half has flared ends.

10. The hitch assembly of claim 1 wherein the first and second bodies are cast.

11. The hitch assembly of claim 1 wherein each recess is U-shaped.

12. The hitch assembly of claim 1 wherein the first and second bodies are bolted together such that the recesses are adapted to engage front and rear surfaces on the tow hook so as to transfer horizontal loads on the tow hook to both of the bodies and eliminate horizontal loads on the bolt.

13. A hitch assembly for a tow hook extending forwardly on a front end of a vehicle, comprising:
   a pair of clamp members each having a recess having a C-shaped cross-sectional profile and having opposite ends defining a C-shaped channel;
   a threaded hole through one of the clamp members;
   a non-threaded hole in the other of the clamp members; and
   a bolt extending through the holes to secure the clamp members together so as to sandwich the tow hook in the recesses.

14. The hitch assembly of claim 13 wherein recesses are adapted to matingly engage the tow hook.

15. The hitch assembly of claim 13 wherein one of the clamp members includes a forwardly extending tongue with a hole to receive a hitch pin.

16. The hitch assembly of claim 15 wherein the ends of the recess of one of the clamp members are flared.

17. The hitch assembly of claim 13 wherein the clamp members are each cast with a one-piece construction.

18. The hitch assembly of claim 13 wherein the recesses are mirror images of one another.

19. The hitch assembly of claim 13 where in the holes are on an inside perimeter of the recesses.

20. The hitch assembly of claim 13 wherein the holes reside between the opposite ends of the recesses.

\* \* \* \* \*